Nov. 25, 1969      L. G. KILMER      3,480,102
SEISMIC WAVE GENERATING APPARATUS
Filed Nov. 28, 1967        2 Sheets-Sheet 1

INVENTOR.
LAUREN G. KILMER
BY McLean, Morton & Boustead
ATTORNEYS.

Nov. 25, 1969  L. G. KILMER  3,480,102
SEISMIC WAVE GENERATING APPARATUS
Filed Nov. 28, 1967  2 Sheets-Sheet 2
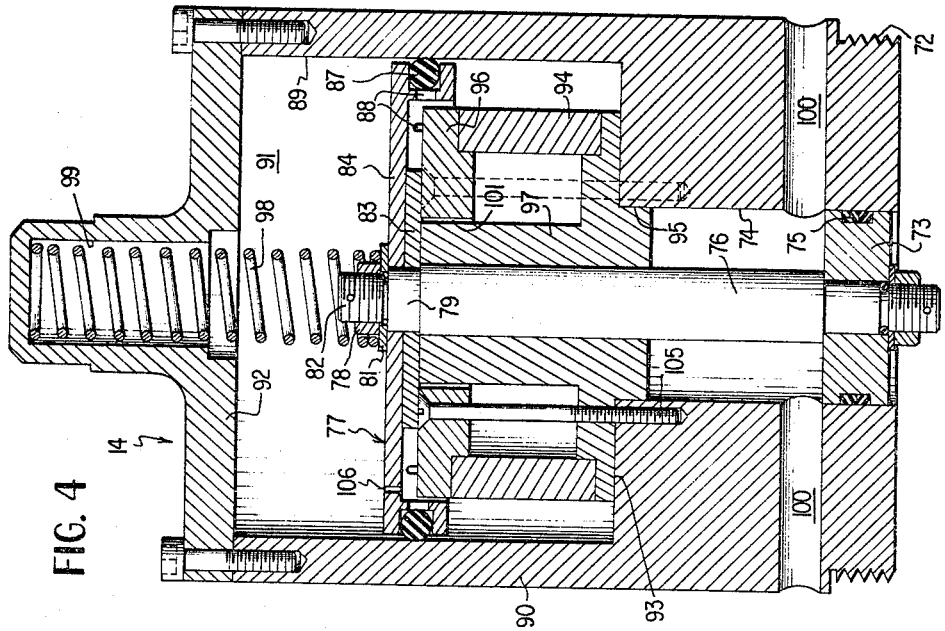
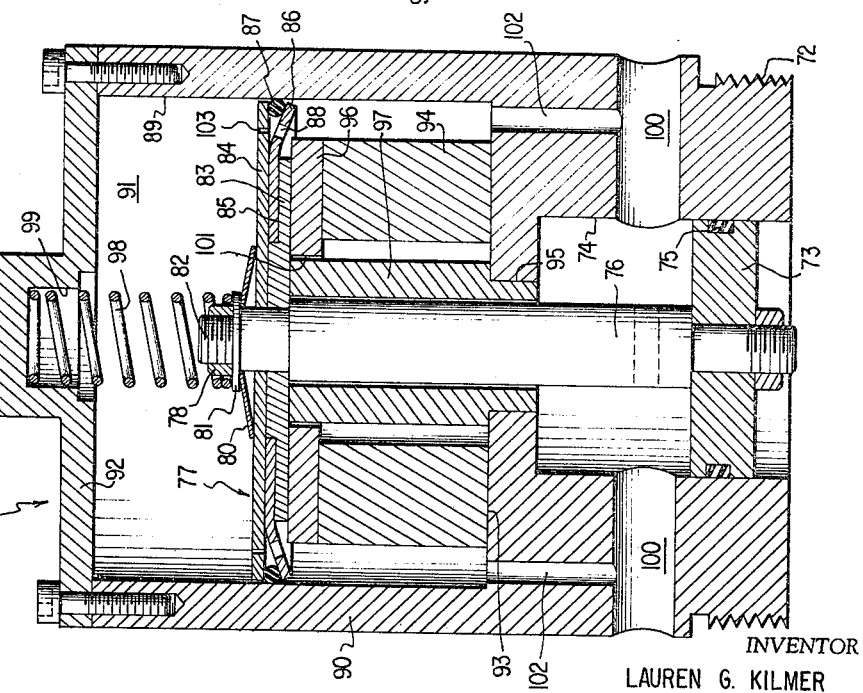
INVENTOR
LAUREN G. KILMER
BY McLean, Morton & Boustead
ATTORNEYS United States Patent Office 3,480,102
Patented Nov. 25, 1969

3,480,102
SEISMIC WAVE GENERATING APPARATUS
Lauren G. Kilmer, Tulsa, Okla., assignor to Sinclair Research, Inc., New York, N.Y., a corporation of Delaware
Filed Nov. 28, 1967, Ser. No. 686,180
Int. Cl. G10k 11/00; G01v 1/02
U.S. Cl. 181—.5                                                     11 Claims

ABSTRACT OF THE DISCLOSURE

A gas exploder seismic wave generator which includes an explosion chamber having an extensible sidewall and a magnetically operated pressure release valve for rapidly exhausting the explosion chamber substantially simultaneously with the occurrence of relative movement between the top and bottom of the chamber including means providing a delay in the closure of the valve to permit substantially complete exhaustion of the chamber.

---

A widely used method of geological exploration includes the production of a seimic wave which is reflected or refracted by a particular sub-surface formation. Such reflections and refractions are recorded as seismograms which provide as indication of what the structure of the underground formation may be. As described in my U.S. Patent No. 3,314,497 a gas explosion, confined in an expansible chamber acting at the earth-air interface against a large mass positioned above such gas explosion, can be utilized to impart a compressive pulse to the surface of the earth beneath the gas explosion, thereby initiating a seismic wave.

The useful energy of such a device occurs at the moment of the explosion before there is any significant upward movement of the top of the device, i.e., the imposed mass, occurring as a result of the explosion. It is therefore desirable to vent the chamber in which the explosion is confined, the moment vertical extension of the sidewalls occurs. Such rapid venting serves to decrease the time between "shots," permits substantial exhaustion of the exploder after each "shot," and emphasizes the desired wave produced by the heat of reaction.

The present invention includes a novel pressure release valve means for rapidly venting the explosion chamber of the seismic wave generator which preferably is formed by a rigid top and rigid bottom telescoping within one another to form the chamber and has a resilient sealing means sealing the top and bottom. According to the invention, the exploder includes an explosion chamber formed with a rigid top and a rigid bottom adapted to be coupled to the surface of the earth, which chamber is rapidly vented following detonation of a combustible charge therein. The exhaust or venting means for the chamber can preferably be, for example, a valve arrangement designed to release the gases formed by the explosion simultaneously with the occurrence of relative movement between the top and bottom of the exploder. A piston-like valve element, held closed by magnetic means, arranged in an opening in the rigid top forming the chamber is quite suitable for this purpose. Such a valve will retain gas up to maximum fill pressure without leaking and will automatically open from the pressure of an external explosion. The valve is designed so that when the valve is open, there is less force to cause it to close than there is for keeping it closed when the valve is in a closed position. Such a valve, therefore, will remain open longer than it would if it had a spring to hold it closed and permit substantially complete exhausting of the chamber.

The explosion which initiates the seismic wave in accordance with this invention can be produced by detonating in the chamber an explosive, combustible charge such as oxygen and any fuel gas, e.g., hydrocarbon or petroleum-derived, which may be detonated with a sufficient heat of reaction to produce a compressional wave for initiating the seismic wave. The fuel gas is usually mixed with oxygen in approximately stoichiometric amounts although a slight excess of oxygen may be preferred. Mol ratios of from about one-half mol excess fuel to one-half mol excess oxygen are preferred.

For a more complete understanding of the practical application of my invention reference is made to the appended drawings in which FIGURE 1 is an isometric view of a gas exploder constructed in accordance with my present invention;

FIGURE 3 is a vertical section of the valve of the gas exploder taken at line 1—1 in FIGURE 1.

FIGURE 4 is a vertical section of the valve of the gas exploder taken at line 2—2 in FIGURE 1 and is an alternate construction of the valve armature shown in FIGURE 3.

Figure 1:
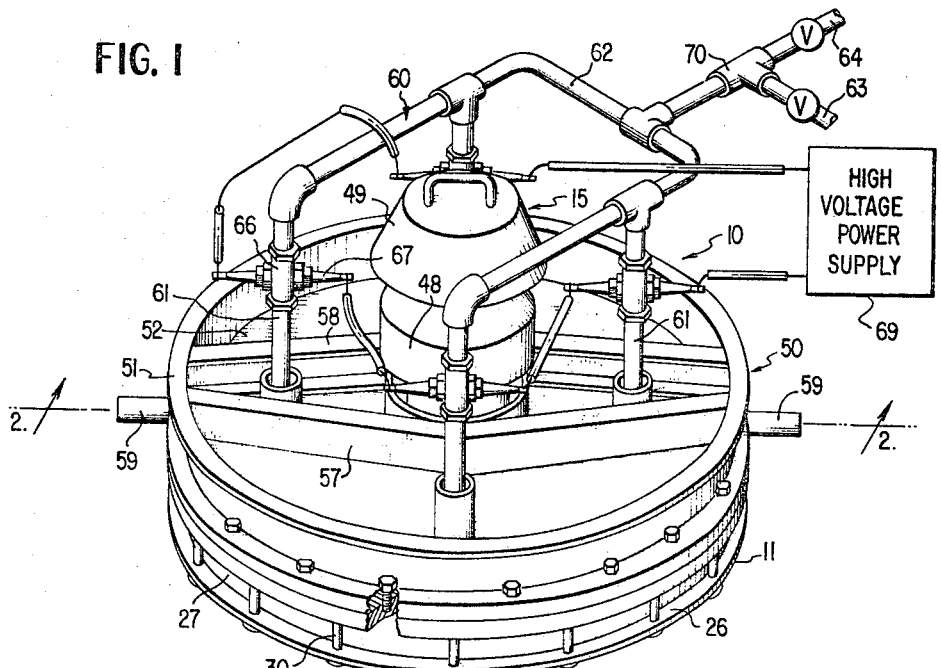
Figure 2:
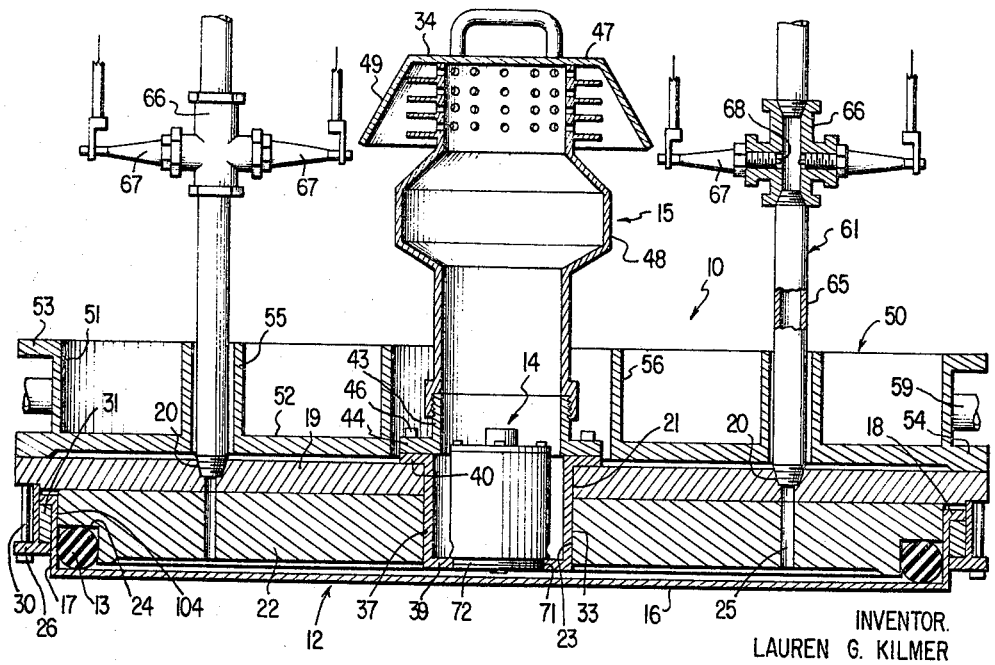
FIGURE 2 is a vertical section taken at line 2—2 in FIGURE 1.

Referring more particularly to FIGURES 1 and 2, the reference number 10 designates a gas exploder constructed in accordance with the present invention. Gas exploder 10 basically includes a top 11, a bottom 12, a sealing ring 13, a valve 14 and an exhaust stack 15. Bottom 12 includes a circular steel plate 16 which at its rim is provided with an integral, upstanding, cylindrical flange 17 which at its upper end carries an integral, outwardly-extending, short, annular flange 18.

Top 11 includes a thick, annular steel plate 19 having an outside diameter slightly larger than the outside diameter of flange 18 and further provided with a central opening 21 and four small, tapped, vertical openings 20 disposed at 90° intervals about plate 19 approximately midway between central opening 21 and its rim. Plate 19 carries a depending, coaxially positioned, generally annular, iron casting 22 which is welded to the underside of plate 19. Casting 22 is approximately of the same height as flange 17 on bottom plate 16 and has an outside diameter slightly less than that of flange 17 such that top plate 19 can be positioned coaxially over bottom plate 16 with casting 22 spaced slightly inward of flange 17. Of course, if desired, the plate and casting can be of one piece. Casting 22 has a center opening 23 approximately the same diameter as opening 21 and is stepped inwardly at its lower, outer edge to form an annular seat 24 sized to receive O-ring 13. Casting 22 is further provided with four vertical passages 25 which are disposed at 90° intervals about casting 22 and are positioned such that they coincide in location with tapped openings 20 in plate 19.

It will be noted that sealing ring 13, which can be made of chloroprene rubber, is positioned resting on bottom plate 16 just inside flange 17 such that seat 24 rests on it. Preferably the thickness of ring 13 is sufficient that the bottom of casting 22 slightly clears the top of bottom plate 16 and the sides of ring 13 are just tangent to the side of casting 22 below seat 24 and the inner side of flange 17.

Bottom 12 and top 11 are retained together by means of a hoop 26 positioned encircling flanges 17 and 18. Hoop 26, which has the cross-section of an inverted T, consists of a vertical, cylindrical portion having inwardly and outwardly extending, annular flanges at its lower end and is secured to the underside of the rim of plate 19 by means of a series of cap bolts 30 which extend upwardly through apertures disposed at intervals about the outer annular flange of hoop 26 with their shank ends threadedly received in correspondingly positioned tapped openings in the underside of the rim of plate 19 to hold hoop 26 firmly against the underside of plate 19.

The inside diameter of the cylindrical portion of hoop 26 is sized just to clear flange 18 on bottom 12 such that the inner annular flange at the lower end of hoop 26 is spaced below and underlies flange 18 to receive a strip 31 of hard chloroprene rubber between hoop 26 and flange 17. Rubber strip 31, as shown, has cross-sectional dimensions generally filling the space between the lower inner flange on hoop 26 and flange 18; however, if desired, an O-ring can be used.

Referring now to FIGURES 2 and 3, the exploder assembly includes valve 14 and valve housing 33. Generally, valve housing 33 includes cylindrical wall 37 and inwardly extending annular flange 39 provided at the lower end of cylindrical wall 37. Inwardly extending flange 39 is provided with thread means 71 in its inner annular surface. Cylindrical wall 37 at its upper end is provided with an outwardly extending annular flange 40 and itself has a diameter just less than that of openings 21 and 23 such that valve housing 33 can be positioned in openings 21 and 23 with flange 40 overlying the top of plate 19.

Cylinder 43 is threaded at its upper end and has an outwardly projecting annular flange 44 at its lower end. Cylinder 43 has the same inside diameter as sidewall 37 of valve housing 33 and is positioned above valve housing 33 with annular flange 44 overlying flange 40. Cylinder 43 is retained in such position by a series of cap bolts 46 received in apertures in flanges 40 and 44 which register with correspondingly disposed tapped holes about opening 21 in plate 19.

Valve 14 is designed to fit within cylindrical wall 37 of valve housing 33 thereby forming an annular space between walls 37 and 90. Thread means 72 provided at the base of valve 14 mate with thread means 71 provided in the inner annular surface of inwardly extending annular flange 39 of valve housing 33 and position valve 14 in the assembly of exploder 10.

Piston 73 is a machined casting sized to fit snugly but slidingly within machined cylindrical wall 74 and is equipped with piston rings 75 which are inserted in grooves machined in the outer surface of piston 73 to provide for sealing piston 73 within cylindrical wall 74. Piston rings 75 are never disengaged from cylindrical wall 74 and, being inorganic, are not subject to burning from incandescent gases sweeping past.

Stem 76 is fabricated from stainless steel or a similar non-magnetic material and connects piston 73 with armature 77. The upper end of stem 76 has a reduced shank 79 with threaded end 82. Annular armature 77 along with collar 80 and washer 81 are positioned on shank 79 and secured to it by nut 78 fastened on threaded end 82. Armature 77 comprises three sections. Bottom section 83 of armature 77 is annular in shape and is fabricated from soft iron or a similar magnetic material. Top section 84 of armature 77 is also annular in shape and is fabricated from brass or a similar non-magnetic material. Bottom section 83 is of a smaller diameter than top section 84 and contains groove 85 around its outer upper perimeter. Center section 86 of armature 77 is annular in shape and is fabricated from copper or a similar non-magnetic material. Center section 86 fits into groove 85 in bottom section 83 and is sandwiched between top section 84 and bottom section 83. Center section 86 is shaped in such a manner that its outer perimeter flares downward and away from top section 84 to enable O-ring 87 to be inserted and held in place by the outer peripheries of sections 84 and 86. Center section 86 also contains holes 88 located around its outer perimeter opposite the void area formed within sections 84, 86 and O-ring 87. The outer perimeters of sections 84 and 86 are machined to fit snugly but slidingly within machined cylindrical wall 89 of valve 14. O-ring 87 acts to form a seal between armature 77 and wall 89.

Circular inner wall 89 forms chamber 91 which is bounded by chamber top 92 and chamber bottom 93. Annular shaped magnet 94 is mounted in chamber 91 on chamber bottom 93 around hole 95 in chamber bottom 93. Annular ring 96 which is fabricated from soft iron or a similar suitable material is set on top of magnet 94. Center pole piece 97 is mounted in bottom hole 95 and extends upwards into chamber 91 through but not contacting annular ring 96 to the upper level of annular ring 96. Center pole piece 97 is annular in shape and houses stem 76 within its annulus. Armature 77 is positioned above and piston 73 is positioned below center pole piece 97.

When valve 14 is in the closed position, bottom section 83 of armature 77 is attracted and held by the force of magnet 94 to annular ring 96 and center pole piece 97. The magnetic flux path runs from magnet 94 into the body of valve 14, which is a magnetic material, through chamber bottom 93, then upward through center pole piece 97 into armature section 83 and then returns to magnet 94 through annular ring 96. Air gap 101 around annular ring 96 and center pole piece 97 allows the holding attraction between annular ring 96, center pole piece 97 and armature section 83 and such attraction is sufficient to keep piston 73 in its downward position and valve 14 closed even against relatively high pressures.

When valve 14 is open and armature 77 is in its uppermost position within chamber 91, springs 98, which communicates between washer 81 and recessed area 99 in chamber top 92, is compressed and contained along with nut 78 and washer 81 in recessed area 99. Spring 98 is a small spring and is employed merely to aid in returning armature 77 to annular ring 96 and center pole piece 97 until there is sufficient magnetic force to close valve 14.

The sealing action of O-ring 87 between armature 77 and inner wall 89 provides an air cushion for armature 77 during its travel within chamber 91. When armature 77 travels upwards, O-ring 87 is forced against armature section 86 and wall 89. Air then flows out of chamber 91 above armature 77, passing between armature section 84 and O-ring 87, through holes 88 and into space between magnet 94 and wall 89 and pressure relief holes 102 into port holes 100. When armature 77 travels downward, however, O-ring 87 is forced against armature section 84 and wall 89 which seals chamber 91 above armature 77 so that air returns to it slowly through orifice 103. This overcomes the force of spring 98 forcing valve 14 to immediately snap closed while giving a desired ½ to 1 sec. delay in valve closing thereby exhausting exploder 10 after each "shot." The action of the high flux density in gap 101 on armature 83 then holds the valve shut against internal fill pressure.

When piston 73 is displaced to its upper position within cylindrical wall 74, port holes 100 in valve 14 are completely exposed to communicate the space confined between bottom 12 and top 11 with the annular space between wall 37 of valve housing 33 and wall 90 of valve 14 and hence with the exterior of exploder 10 through cylinder 43 into muffler 15.

Muffler 15, which is of any conventional construction providing low-pass characteristics desirably having an upper cut-off frequency on the order of five cycles per second, is threadedly received at its open, lower end on the upper end of cylinder 43 and is provided with lateral openings 47 about its upper, closed end to permit venting of gases passing upwardly through valve 14 into muffler 15. Interiorly muffler 15 is hollow, in the illustrated case, and is centrally enlarged as indicated by the reference numeral 48. A frusto-conical deflector skirt 49 is mounted at the upper end of muffler 15 above openings 47 and extends downwardly and outwardly to below the level of openings 47. Optionally openings 47 can be disposed in several rows about the top of muffler 15 underlying deflector skirt 49, and the upper end of muffler 15 can be further provided, if desired, with external annular baffles 34 positioned within deflector skirt 49 and spaced inwardly therefrom, each such baffle 34 being attached to muffler 15 between an adjacent pair of rows of openings 47.

It will be noted gas exploder 10, as illustrated in FIGURES 1–3, is further equipped with a shallow cylindrical tank 50 including, as integral parts, a cylindrical sidewall 51, an annular bottom plate 52, outwardly extending, annular flanges 53 and 54 at the upper and lower ends of sidewall 51, respectively, and four upstanding sleeves 55 having their lower ends disposed in openings in plate 52 registering with openings 20 but having wider diameters than openings 20. In addition the central aperture of plate 52, which is wider than flanges 40 and 44 on valve housing 33, is also provided with an integral, upstanding sleeve 56, the lower end of which is disposed in such central aperture. Tank 50 is further provided with a pair of slightly bowed braces 57 and 58 which are in juxtaposition with their adjacent end pairs close and welded to the inside of sidewall 51 and with their centers bowed away from each other with sleeve 56 between them.

Exteriorly tank 50 is provided at diametrically opposite positions in its sidewall 51 with a pair of outwardly extending stub shafts 59 which are secured to sidewall 51, each adjacent one pair of adjacent ends of braces 57 and 58. Stub shafts 59 can be used for carrying gas exploder 10 in a fork-type device. If desired, tank 50 can retain a lead casting within sidewall 51 for extra weight. In such case sleeves 55 and 56 serve to provide access to openings 20 and valve 14, respectively.

Referring to FIGURES 1 and 2, gas exploder 10 further requires a gas charging and ignition system, generally designated by the reference number 60. Charging and ignition system 60 basically includes four upstanding conduits 61 interconnected at their upper ends through a header 62 and mixing unit 70 to separate valved connections 63 and 64 leading to storage cylinders, respectively; for a suitable combustible fuel gas, e.g., propane, propylene, etc., and oxygen.

Each upstanding conduit 61 includes a pipe section 65 threadedly received at its lower end in a tapped aperture 20 in plate 19, and, threadedly received on the upper end of such pipe section 61, a four-way fitting 66. Header 62 generally includes suitable nipples, elbows and T's, as well as pipe sections, to provide a U-shaped connection communicating the upper openings of four-way fittings 66, with valved conduits 63 and 64 which are preferably connected to the bottom of the U.

Eight spark plugs 67 having their ground electrodes removed are connected, two to each four-way fitting 66, in the lateral openings of fittings 66 such that, as shown most clearly in FIGURE 2, the insulated electrodes 68 of each thusly associated pair of plugs 67 face each other in such fitting 66. Exteriorly eight spark plugs 67, thusly mounted, are electrically connected in series across a suitable electrical supply 69 which is capable of impressing a high voltage, typically on the order of 70,000 volts, across serially interconnected spark plugs 67 at any desired instant in time.

Referring now to FIGURE 4, armature 77 as shown in FIGURE 3 can be of an alternate construction as shown in FIGURE 4.

Annular armature 77, as shown in FIGURE 4, is positioned on shank 79 in the same manner as previously described. In this alternate construction, armature 77 comprises two sections. Bottom section 83 of armature 77 is annular in shape and is fabricated from soft iron or a similar magnetic material. Top section 84 of armature 77 is also annular in shape and is fabricated from brass or a similar non-magnetic material. Bottom section 83 is of a smaller diameter than top section 84. Top section 84 is recessed around its outer perimeter to enable O-ring 87 to be inserted and held in the recessed portion around the outer perimeter. The bottom of section 84 is also recessed and holes 88 located around the outer perimeter of section 84 surround this bottom recess and holes 88 communicate the bottom recess with the outer perimeter recess. The outer perimeter of section 84 is machined to fit snugly but slidingly within machined cylindrical wall 89 of valve 14. O-ring 87 acts to form a partial seal between armature 77 and wall 89.

Valve 14 is held in the closed position in the same manner as previously described.

When valve 14 is open and armature 77 is in its uppermost position within chamber 91, spring 98, which communicates between washer 81 and recessed area 99 in chamber top 92, is compressed and contained along with nut 78 and washer 81 in recessed area 99. Spring 98 is a small spring and is employed merely to aid in returning armature 77 to annular ring 96 and center pole piece 97 until there is sufficient magnetic force to close valve 14.

The sealing action of O-ring 87 between armature 77 and inner wall 89 provides an air cushion for armature 77 during its travel within chamber 91. When armature 77 travels upwards, O-ring 87 is forced against the lower part of the recess in section 84 and wall 89. Air flows out of chamber 91 above armature 77, passing between the upper outer perimeter of section 84 and O-ring 87, through hole 106 and holes 88, into the space between magnet 94 and wall 89. When armature 77 travels downward, O-ring 87 is forced against the upper part of the recess in section 84 and wall 89. This creates a suction, partially seals chamber 91 above armature 77 and air returns to chamber 91 by slowly passing through hole 106 from the space below the armature 77 and the space between magnet 94 and wall 89. This overcomes the force of spring 98, forcing valve 14 to close and give a desired ½ to 1 sec. delay in valve closing thereby exhausting exploder 10 after each "shot." The action of spring 98 aids in initially admitting air to chamber 91 above armature 77.

In operation gas exploder 10 is located at a suitable location with bottom 12 resting on the ground at a spot clear of large stones and other undesirable structure. Typically magnet 94 has sufficient holding force such that operation of piston 73 does not occur until a pressure within exploder 10 on the order of 10 p.s.i.g. or greater has been reached. Valved conduits 63 and 64 are then opened to admit fuel gas and oxygen until a pressure in exploder 10 on the order of 2 p.s.i.g. has been achieved. It will be apparent that a stoichiometric mixture of oxygen and propylene, or a slight excess of oxygen, is sought and that this can be achieved quite simply by introducing the gases such that the partial pressures of each are in proportion to the molar ratio of a stoichiometric mixture of oxygen and fuel gas, i.e. $4.5:1-O_2:C_3H_6$.

Mixing unit 70 insures complete mixing of the gases before they are introduced into the chamber formed between bottom 12 and top 11.

With valved conduits 63 and 64 closed, exploder 10 is properly charged and an explosion can be initiated simply by actuating high voltage source 69 at the desired point in time, whereupon high potential is placed across the serial connection of the eight spark plugs 67. It will be apparent that in the event of any fouling of spark plugs 67 at least two active gaps from an electrode 68 to ground or another electrode 68 are nevertheless provided such that combustion of the mixture of gases within exploder 10 is initiated, with a resultant explosion occurring substantially simultaneously with energization of plugs 67.

When exploder 10 is charged the cross-section of sealing ring 13 is of substantially circular shape and the surfaces of flange 17, of plate 16 and of casting 22 are tangent to the exterior of ring 13. As the gases are exploded, however, subsequent to the initial shock wave of the explosion which creates the seismic wave of interest, the continued expansion of the exploding gases drives the bottom 12 down and the weight of top 11 and its associated equipment upwardly relative to bottom 12 tending to compress resilient strip 31, which can so yield, although in a limited manner. At such time the pressure of the exploding gases forces sealing ring 13 tightly against joint 104 formed between the flange 17 and casting 22, generally deforming ring 13 against such joint and, at the same time, lifting ring 13 with the rising structure support on and by plate 19.

At the same time as relative movement of the bottom 12 and top 11 occurs, piston 73 is lifted at even faster rate to rapidly vent the interior of gas exploder 10 through valve 14 and muffler 15. This venting-action is so rapid that normally the pressure is relieved and top 11 again collapses on bottom 12, e.g. within a fraction of a second. Generally after such collapse, which collapse is cushioned by sealing ring 13, the pressure of unvented combustion gases remaining between top 11 and bottom 12 is substantially negative to atmospheric, being on the order of five p.s.i.a., and as a result, it is usually unnecessary in subsequent firing to purge the interior of gas exploder 10 when recharging, accordingly, recharging may be accomplished so fast that repetitive firing at significantly rapid rates, e.g. on the order of 5 per second, is feasible.

To illustrate the effectiveness of my method and device for initiating seismic waves, clear records have been obtained with explosive charges including stoichiometric amounts of oxygen and respectively, propane, methane and propylene; with explosive charges containing oxygen in an amount sufficient to provide one-half mol oxygen above the stoichiometrically required amount and respectively propane and propylene; and with explosive charges containing oxygen and propane above the stoichiometrically required amount.

It is claimed:

1. In a device for propagating a seismic wave at the surface of the earth by the explosion of a combustible mixture in a chamber having a rigid bottom and rigid top resiliently fastened together to permit limited vertical movement of the top relative to the bottom, the improvement of magnetically operated pressure release valve means for rapidly venting the chamber substantially simultaneously with the occurrence of relative movement between the bottom and the top comprising:

a valve body having a passage connecting the chamber with the atmosphere, a piston, slidably arranged within the passage, whereby upon the occurrence of an explosion in the chamber the pressure of the gases produced in the chamber causes movement of the piston thereby opening the passage connecting the chamber with the atmosphere, the piston having a stem rising upwards through the valve body, a magnet assembly mounted within the valve body positioned above the piston, and an armature assembly, within the valve body, attached to the upper part of the stem above the magnet and connecting the poles of the magnet assembly when the valve means is closed thereby providing a force tending to keep the valve means closed, said armature assembly including means of non-magnetic material extending across the valve body and attached to the valve stem, said means including a portion forming a seat for an O-ring and having holes around its outer perimeter; and an O-ring, said O-ring being arranged with said seat whereby during upward armature movement the O-ring is forced against the lower portion of the seat and the wall of the valve body thereby allowing air to pass out of the valve body from above the armature, the air flowing between the non-magnetic means and the O-ring and out the holes in the non-magnetic means thereby cushioning the upward movement of the armature, and whereby during downward movement of the armature, the O-ring is forced against the upper portion of the seat and the wall of the valve body thereby sealing the valve body above the armature at the wall thereof which provides a delay in the closure of the valve means and permits substantially complete exhaustion of the chamber.

2. In a device for propagating a seismic wave at the surface of the earth by the explosion of a combustible mixture in a chamber having a rigid bottom and rigid top resiliently fastened together to permit limited vertical movement of the top relative to the bottom, the improvement of magnetically operated pressure release valve means for rapidly venting the chamber substantially simultaneously with the occurrence of relative movement between the bottom and the top comprising:

a valve body having a passage connecting the chamber with the atmosphere, a piston, slidably arranged within the passage, whereby upon the occurrence of an explosion in the chamber the pressure of the gases produced in the chamber causes movement of the piston thereby opening the passage connecting the chamber with the atmosphere, the piston having a stem rising upwards through the valve body, a magnet assembly mounted within the valve body positioned above the piston, an armature assembly, within the valve body, attached to the upper part of the stem above the magnet, the armature assembly being constructed to act as a piston within the valve body and cushion the upward and downward movement of the armature assembly and thereby the piston after an explosive opening of the valve means to provide a delay in the closure of the valve means and permit substantially complete exhaustion of the chamber, said armature connecting the poles of the magnet assembly when the valve means is closed thereby providing a force tending to keep the valve means closed, and spring means communicating between the armature assembly and the upper valve body, the spring means acting to assist in cushioning the upward movement of the armature assembly and to assist in initiating the downward movement of the armature assembly.

3. In a device for propagating a seismic wave at the surface of the earth by the explosion of a combustible mixture in a chamber having a rigid bottom and rigid top resiliently fastened together to permit limited vertical movement of the top relative to the bottom, the improvement of magnetically operated pressure release valve means for rapidly venting the chamber substantially simultaneously with the occurrence of relative movement between the bottom and the top comprising:

a valve body having a passage connecting the chamber with the atmosphere;

a piston, slidably arranged within the passage, whereby upon the occurrence of an explosion in the chamber the pressure of the gases produced in the chamber causes movement of the piston thereby opening the passage connecting the chamber with the atmosphere, the piston having a stem rising upwards through the valve body and having at least one piston ring arranged in its outer surface and adapted to seal the piston with respect to the passage, a magnet assembly mounted within the valve body and positioned above the piston, an armature assembly, within the valve body, attached to the upper part of the stem above the magnet and connecting the poles of the magnet assembly when the valve means is closed, thereby providing a force tending to keep the valve means closed, said armature assembly including a section of magnetic material and a section of non-magnetic material, said sections being arranged vertically, the botom of the non-magnetic section being recessed and the outer perimeter of the non-magnetic section also including a recessed portion having holes spaced around the outer perimeter thereof which open into the recessed bottom portion of the non-magnetic section, the noning the poles of the magnet assembly when the valve is closed thereby providing a force tending to keep the valve closed; and spring means communicating between the armature assembly and the upper valve body, the spring means acting to assist in cushioning the upward movement of the armature assembly and to assist in initiating the downward movement of the armature assembly.

9. A magnetic valve for controlling the escape of gases from a chamber which comprises:

a valve body having a passage connecting the chamber with the atmosphere, a piston, slidably arranged within the passage, whereby upon the occurrence of an explosion in the chamber the pressure of the gases produced in the chamber causes movement of the piston thereby opening the passage connecting the chamber with the atmosphere, the piston having a stem rising upwards through the valve body, and at least one piston ring arranged in its outer surface and adapted to seal the piston with respect to the passage, a magnet assembly mounted within the valve body positioned above the piston;

an armature assembly, within the valve body, attached to the upper part of the stem above the magnet and connecting the poles of the magnet assembly when the valve is closed thereby providing a force tending to keep the valve closed, said armature assembly including a section of magnetic material and a section of non-magnetic material, said sections being arranged vertically, the bottom of the non-magnetic section being recessed and the outer perimeter of the non-magnetic section also including recessed portion having holes spaced around the outer perimeter thereof which open into the recessed bottom portion of the non-magnetic section, the non-magnetic section also having at least one hole in the recessed bottom portion located beyond the outer perimeter of the magnetic section; and an O-ring, the O-ring being held in the outer perimeter recessed portion of the non-magnetic section against the inner valve body whereby during upward armature movement the O-ring is forced against the lower portion of the non-magnetic section recessed portion and the valve body thereby allowing air to pass out of the inner valve body above the armature, the air flowing between the upper outer perimeter of the non-magnetic section and the O-ring, through the holes in the outer perimeter recessed portion of the non-magnetic section and through the hole in the recessed bottom of the non-magnetic section thereby cushioning upward movement of the armature and whereby during downward movement of the armature, the O-ring is forced against the upper portion of the non-magnetic section recessed portion and the valve body thereby allowing air to pass into the inner valve body above the armature, the air flowing through the hole in the recessed bottom of the non-magnetic section thereby cushioning the downward movement of the armature and providing a delay in the closure of the valve which permits substantially complete exhaustion of the chamber.

10. The magnetic valve of claim 9 including spring means, the spring means communicating between the armature assembly and the upper valve body, the spring means acting to assist in cushioning the upward movement of the armature assembly and to assist in initiating the downward movement of the armature assembly.

11. A magnetic valve for controlling the escape of gases from a chamber which comprises:

a valve body having a passage connecting the chamber with the atmosphere, a piston, slidably arranged within the passage, whereby upon the occurrence of an explosion in the chamber the pressure of the gases produced in the chamber causes movement of the piston thereby opening the passage connecting the chamber with the atmosphere, the piston having a stem rising upwards through the valve body, a magnet assembly mounted within the valve body positioned above the piston, and an armature assembly, within the valve body, attached to the upper part of the stem above the magnet and connecting the poles of the magnet assembly when the valve is closed thereby providing a force tending to keep the valve means closed, said armature assembly including means of non-magnetic material extending across the valve body and attached to the valve stem, said means including a portion forming a seat for an O-ring and having holes around its outer perimeter; and an O-ring, said O-ring being arranged with said seat whereby during upward armature movement the O-ring is forced against the lower portion of the seat and the wall of the valve body thereby allowing air to pass out of the valve body from above the armature, the air flowing between the non-magnetic means and the O-ring and out the holes in the non-magnetic means thereby cushioning the upward movement of the armature, and whereby during downward movement of the armature, the O-ring is forced against the upper portion of the seat and the wall of the valve body thereby sealing the valve body above the armature at the wall thereof which provides a delay in the closure of the valve means and permits substantially complete exhaustion of the chamber.

References Cited

UNITED STATES PATENTS

| | | | |
|---|---|---|---|
| 2,516,247 | 7/1950 | Nuenemann | 137—514.7 |
| 2,700,395 | 1/1955 | Young | 137—529 X |
| 3,235,027 | 2/1966 | Kilmer. | |
| 3,270,763 | 9/1966 | Kiefer | 251—65 X |
| 3,315,698 | 4/1967 | Harmes | 251—65 X |
| 3,376,013 | 4/1968 | Mallett | 251—65 X |

BENJAMIN A. BORCHELT, Primary Examiner

T. H. WEBB, Assistant Examiner

UNITED STATES PATENT OFFICE
CERTIFICATE OF CORRECTION

Patent No. 3480102            Dated November 25, 1969

Inventor(s) Lauren G. Kilmer

It is certified that error appears in the above-identified patent and that said Letters Patent are hereby corrected as shown below:

Column 2, line 19, delete "1-1" and insert therefor --2-2--.

Column 4, line 27, delete "springs" and insert therefor --spring--.

Column 5, line 53, delete "thusly" and insert therefor --thus--

Column 8, line 70, delete "botom" and insert therefor --bottom--

Column 9, line 17, delete "thereby" and insert therefor --whereby--.

Column 9, line 21, immediately after "inner" insert --valve--.

SIGNED AND
SEALED
SEP 22 1970

(SEAL)
Attest:

Edward M. Fletcher, Jr.
Attesting Officer

WILLIAM E. SCHUYLER, JR.
Commissioner of Patents